Aug. 13, 1929.  S. KRIMSTEIN  1,724,667
COLLAPSIBLE RECEPTACLE
Filed May 27, 1926  2 Sheets-Sheet 1
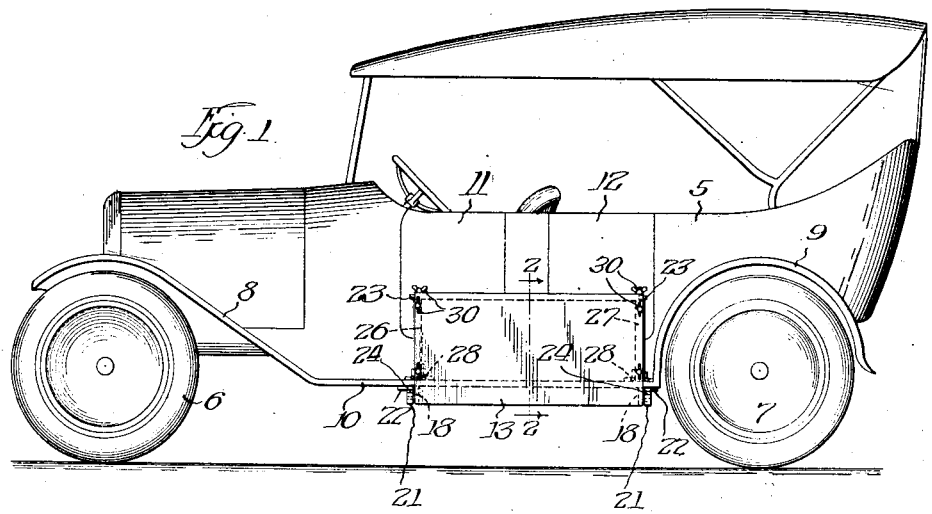
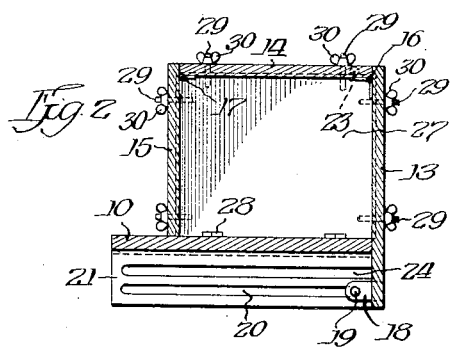
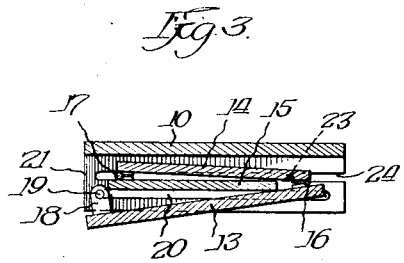
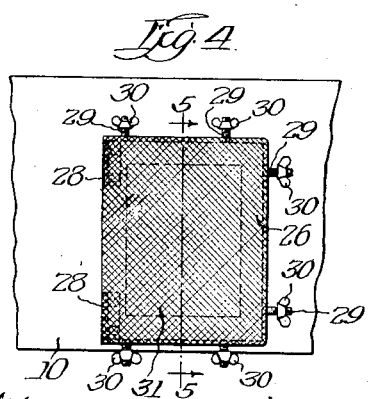
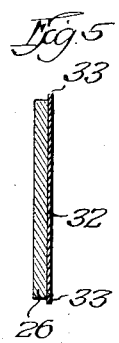
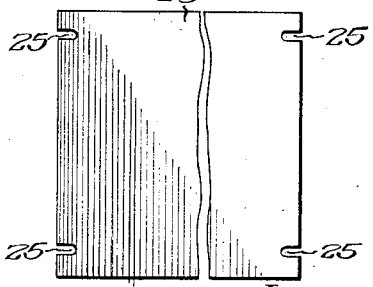

Aug. 13, 1929. S. KRIMSTEIN 1,724,667
COLLAPSIBLE RECEPTACLE
Filed May 27, 1926 2 Sheets-Sheet 2
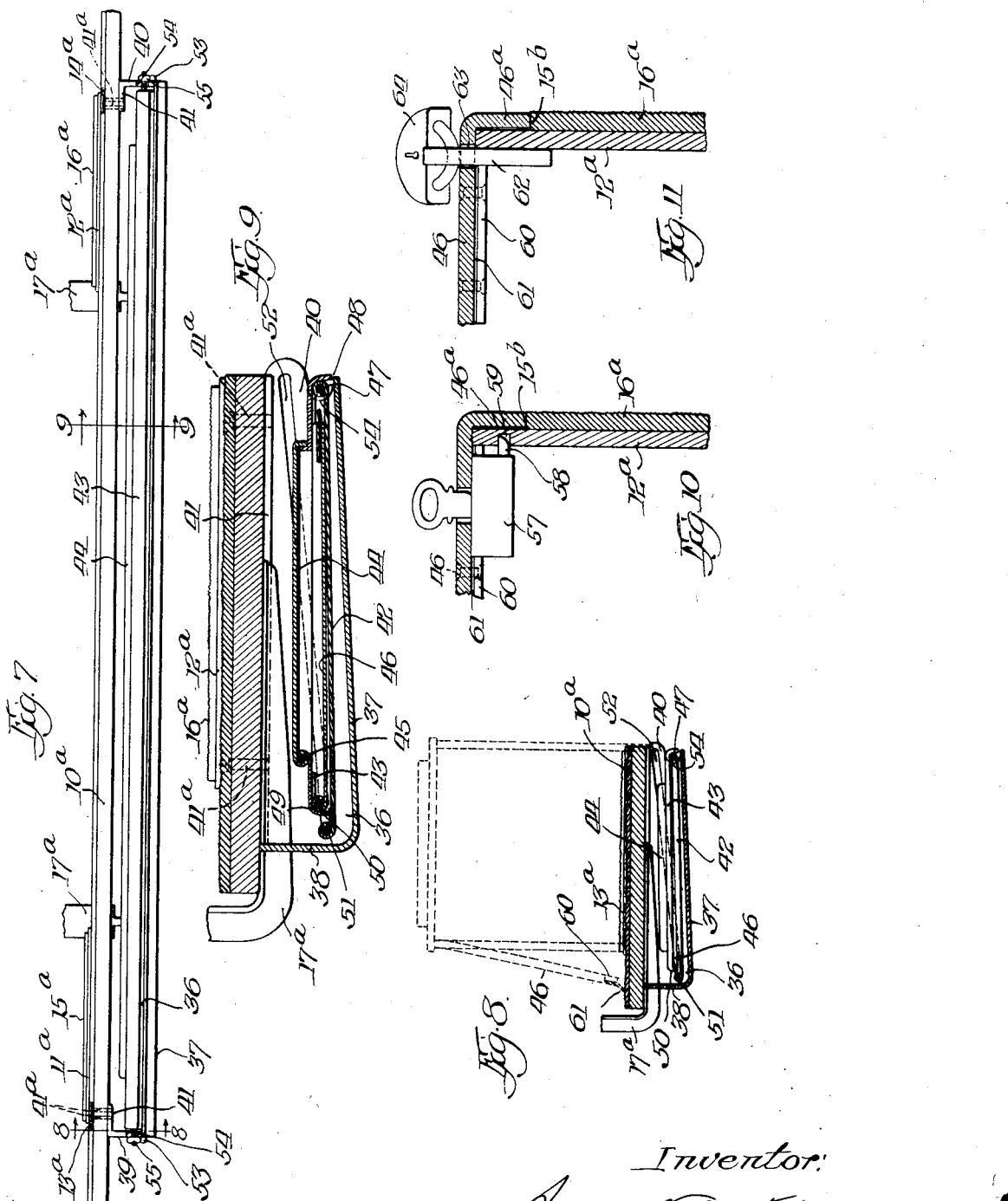
Inventor:
Samuel Krimstein
by attorney
Pane Carpenter Patented Aug. 13, 1929.

1,724,667

UNITED STATES PATENT OFFICE.

SAMUEL KRIMSTEIN, OF CHICAGO, ILLINOIS.

COLLAPSIBLE RECEPTACLE.

Application filed May 27, 1926. Serial No. 111,915.

This invention relates broadly to package and article carriers, and more particularly pertains to an improved collapsible or folding receptacle, and is especially adapted for installation and use upon a vehicle, preferably on the running board or any other suitable projecting part.

While this invention is described and illustrated as applied to the running board of a passenger automobile, it will be readily understood that it is not limited to such an installation, but finds a wide field of utility for other purposes.

The principal objects and advantages which characterize this invention, reside in: The provision of an improved collapsible receptacle; the provision of an improved collapsible receptacle adapted for convenient installation on any suitable available support; the provision of an improved collapsible receptacle especially adapted for installation on an available supporting part of a vehicle; the provision of an improved collapsible receptacle suitable for installation on the running board of an automobile or the like; the provision of an improved collapsible receptacle characterized by the employment of the support therefor as a part of the receptacle; the provision of an improved collapsible receptacle adapted to be installed on a suitable support and foldable in such a manner as to permit of use of the support for other purposes; and the provision of suitable weather proofing means in connection with a collapsible receptacle of the character referred to.

This invention is further and more specifically characterized by the provision of an improved collapsible receptacle adapted for installation on the running board of a passenger automobile and readily foldable out of the way without removal from the running board; the provision of an improved collapsible receptacle for installation on the running board of an automobile or the like, and arranged to employ a part of the running board as a part of the receptacle when set up; the provision of an improved collapsible receptacle which is foldable upon and beneath the running board so as to permit of freedom of use of the running board for other purposes; the provision of an improved collapsible receptacle characterized by the embodiment therein of means for supporting the receptacle in folded position beneath the running board of an automobile; the provision of an improved collapsible receptacle having means for securely retaining the same in either set up or folded positions; and the provision of an improved collapsible receptacle of the character referred to which is strong and durable, weather proof, and is completely hidden from view when not in use.

The foregoing, and such other objects and advantages as may hereinafter appear or be pointed out, are attained in one structural embodiment of the device, illustrated in the accompanying drawing, in which:

Figure 1 is a side elevational view of an automobile, illustrating this invention applied thereto;

Figure 2 is a transverse vertical sectional view, taken on the line 2—2 of Figure 1, looking in the direction indicated by the arrows;

Figure 3 is a view similar to Figure 2, illustrating the receptacle folded beneath the running board;

Figure 4 is a plan view of a detail;

Figure 5 is a sectional view taken on the line 5—5 of Figure 4, looking in the direction indicated by the arrows;

Figure 6 is an elevational view of a detail;

Figure 7 is an elevational view of an alternative form of the invention;

Figures 8 and 9 are transverse sectional views taken on lines 8—8 and 9—9 of Figure 7, looking in the direction indicated by the arrows; Figure 9 being enlarged;

Figures 10 and 11 are enlarged views of alternative forms of details.

Referring more particularly to the drawing, and first to Figures 1 to 6, inclusive, 5 indicates the body of a passenger automobile mounted on the usual wheels 6 and 7, over which latter extend the mud guards 8 and 9, respectively, said mud guards being connected by the conventional running board, 10. Front and rear doors 11 and 12, respectively, are usually provided in the body 5. This invention is described as installed upon the running board 10, but it will be obvious that any other available and suitable support which projects from the vehicle might be employed for supporting the device of this invention.

This invention comprises parts which are supported permanently above the running board, and perform a two-fold function to be hereinafter referred to more specifically, and also other parts which are adapted to be folded beneath the running board when not in use.

The parts which fold beneath the running board and form the major structure or hood of the receptacle, preferably include the outer wall 13, top wall 14, and inner wall 15. The walls 13 and 14 are connected for angular displacement by the provision of the inside hinges 16, and the walls 14 and 15 are similarly connected by outside hinges 17. The front wall 13 is a greater length than that of the rear or inner wall 15, and is provided with inwardly extending lugs 18—18, said lugs having each a pivot pin 19, which pins extend into complemental guide slots 20 provided in the rails 21—21, which latter are secured in parallel relationship transversely on the under surface of the running board. The rails are provided with angularly disposed flanges 22, which may be secured by screws or the like to the running board.

The top wall 14 is provided with pins 23—23, said pins projecting from the opposite free ends of said wall 14, near the hinges 16, and are adapted to be received in the slots 24—24, also provided in the rails 21. The slots 24 are open ended toward the outer ends of the rails, that is, the slots 24 open under the outer edge of the running board.

The walls 13, 14, and 15, along their free opposite margins, are each provided, as best shown in Figure 6, with complementally arranged notches 25—25. On the top surface of the running board there are provided wall members 26 and 27, said members 26 and 27 forming the end walls of the receptacle, when set up, as shown in Figures 1 and 2. The end walls 26 and 27 are hingedly mounted upon the upper surface of the running board, as indicated at 28, and are provided with complementally arranged outwardly extending bolts 29—29, adapted for reception in the complementally arranged notches 25 in the walls 13, 14, and 15, wing-nuts 30—30 being provided on each of said bolts for rigidly holding the end walls and outer, inner, and top walls together on top of the running board. It will be observed that the end walls 26 and 27 are so hinged that, when folding same on the running board, these walls swing toward each other, or inwardly with respect to the other walls of the device. Obviously the end walls 26 and 27, when swung into the vertical position, abut the adjacent surface of the running board. Each of the end walls is provided with a mat 31, so that when the said end walls are lowered upon the running board, these mats are presented beneath each of the doors 11 and 12. The mats may be cleaned by elevating the walls 26 and 27.

In order to render the device weatherproof, each of the end walls 26 and 27 is provided with a layer 32, of rubber, rubberized cloth, or any other suitable flexible material, the margins of said layers projecting slightly beyond the margins of the end walls, as best shown at 33 in Figure 5. The projecting portions 33 are engaged between the margins of the end walls 26 and 27, and the adjacent surfaces of the walls 13, 14, and 15, and when the wing-nuts 30 are tightened, a substantially water-proof and dust-proof receptacle is afforded.

When the receptacle thus provided is to be folded out of the way, the wing-nuts 30 are released and the walls 13, 14, and 15, swung downwardly underneath the running board as shown in Figure 3. When the walls 13, 14, and 15 are thus folded or collapsed, they take a generally Z-shaped relationship, that is, the hinge 16 permits the wall 14 to be swung inwardly upon the wall 13, and the hinge 17, being reversed with respect to the hinge 16, permits the wall 15 to be folded outwardly upon the wall 14. As the pivot pins 19 slide inwardly in their slots 20, the pins 23 complementally engage the slots 24, and thus the device is effectively retained against accidental displacement. Displacement is furthermore prevented by the generally inclined disposition of the walls when folded. It will be readily observed that the wall 13, when the receptacle is set up, abuts the outer edge of the running board, and that the projecting upper edge of the wall 13, designated 34, overlaps and abuts the outer edge of the wall 14. Thus the rigidity of the receptacle, when set up, is assured.

Referring now more particularly to the alternative form of the invention, shown in Figures 7 to 11, both inclusive, and first referring to Figures 7 to 9, it will be observed that a metallic container is provided, in certain respects simplifying the construction shown in Figures 1 to 6 and affording additional elements, among which is improved means for protecting the parts from mud, water and the like thrown from the wheels of vehicle. The running board is shown at 10$^a$ and may be of the usual construction found in automobiles. The running board is conventionally supported by brackets 17$^a$, and the device of this invention is constructed, as will hereinafter appear, so as to accommodate said brackets.

In this form of the invention the device includes the end walls 11$^a$ and 12$^a$, hingedly mounted at 13$^a$ and 14$^a$, respectively, on the top of the running board, said end walls being spaced apart a distance such as will afford foot plates on the running board when the end walls are down, as shown in Figure 7, and so as to afford closing means for the ends of the receptacle when upstanding, as shown in Figure 8. The walls 11$^a$ and 12$^a$ are suitably provided with serrated plates, 15ª and 16ª, which are of slightly less size than that of walls 11ª and 12ª, so that end flanges on the top and sides will engage in the shoulders afforded by said serrated plates, as will hereinafter appear.

The parts which fold beneath the running board include a casing or protecting hood 36, composed of a bottom wall 37, spaced from the under side of the running board 10ª, said wall 37 having its inner end upturned as at 38, and abutting the under surface of said running board 10ª. The wall 38 is slotted to accommodate the brackets 17ª. The end walls 39 and 40 of the hood 36 are in the nature of brackets, provided with base portions 41—41, which are provided with internally threaded apertures for the reception of flat-head screws 41ª which pass through the hinges 13ª and 14ª of the end walls 11ª and 12ª, and into said threaded apertures of the base members 41, so as to rigidly secure the hood 36 to the under side of the running board, and to secure the hinges of the end walls 11ª and 12ª of the upper side of the running board, thus materially simplifying the installation of the device on a running board.

The movable parts of the collapsible container which are adapted to fold and be received into the hood 36 include an outer side wall 42, a top wall 43 provided with an opening closed by a cover 44, hinged at 45, and a rear wall 46. The front wall 42 is hinged to the top wall 43 by the provision of an internal hinge 47, the top wall having an inwardly bent flange 48, which prevents access to the hinge when the device is set up and also prevents the entrance of moisture and dust into the container. Similarly the rear wall 46 is hingedly connected at 49 by means of an internal hinge to the top wall 43, and the latter is provided with a marginal flange 50, which performs a function similar to that of the flange 48. Furthermore, the two flanges 48 and 50 form stop members to insure that the front and rear walls will be substantially perpendicular to the top wall when the device is set up. The front wall 42 is provided at its inner end, opposite to the hinge 47, with a portion rolled upon a rod 51, the ends of said rod projecting beyond the end margins of the wall 42, and also projecting through complemental inclined slots 52—52 in each of the bracket walls 39 and 40. The ends of the rod 51 are threaded to receive wing nuts 53, which serve to fix the wall 42, either at the innermost end of the slots when the device is folded, or at the outermost ends of the slots when the device is set up. It will be observed from Figure 9 that the outer end of the slots 52 lies beyond the outer edge of the running board 10ª, so that it will permit the front wall 42, when perpendicular, as shown in Figure 8, to lie against the outer edge of said running board, thereby preventing rattling of the front wall when the device is set up.

The hinge rod of the hinge 47 projects beyond each end of the hinge, so that when the device is folded, as shown in Figure 9, said rod will seat in recesses 54, formed in the bracket walls 39 and 40, wing nuts 55—55 serving to lock the walls 43 and 46 against rattling when the device is folded within the hood 36.

The rear wall 46 is provided with marginal end flanges, 46ª, as shown in Figures 9 and 10 and 11, which engage in the shoulders 15ᵇ formed on the end walls 11ª and 12ª, when the device is set up, and these flanges, 46ª, serve to abut the top wall 43 when the device is folded, so as to additionally prevent rattling.

When the device is set up, as shown in Figure 8, the end walls are permitted to lie flat on the running board and the wing nuts 53 and 55 are loosened to permit the whole structure to be withdrawn from the hood 36 until the rod 51 abuts the outer ends of the slots 52. The top is then lifted and the rear wall 46 is lowered, so that a substantially rectangular structure is built up on the top of the running board 10ª, immediately under the end walls 11ª and 12ª. The cover 44 is then raised and the operator reaches into the interior of the box and lifts the end walls into position, care being taken to keep the rear wall out at an angle such as indicated at dotted lines at 56 in Figure 8 until the end walls are in position. When the end walls are in position with the flanges on the front wall, and top wall seating on the shoulders provided on the end walls 11ª and 12ª, the rear wall 56 is then pressed downwardly to close and complete the container. In order to lock the structure in position, the rear wall 46 may be provided with a conventional sliding bolt lock 57, the bolt 58 of which is adapted to engage in a recess 59, formed in the walls 11ª and 12ª, as shown in Figure 10, said wall 46 being reinforced, as at 60, and carrying a rubber gasket 61, which is adapted to lie upon the upper surface of the running board 10ª, and prevent ingress of dust and moisture to the interior of the collapsible box.

In the alternative form of lock, shown in Figure 11, a lug 62 may be formed on the inner surface of the walls 11ª and 12ª, and project through an opening 63 in the wall 46, said lug being provided with a suitable aperture for receiving the yoke of a padlock 64.

Having thus described my invention and illustrated its use, what I claim as new and desire to secure by Letters Patent is:—

1. In combination with a vehicle running board, a collapsible casing adapted to be folded beneath the running board, and closing elements for said casing supported above and upon the running board and serving as step treads when the casing is collapsed.

2. A receptacle for luggage and the like, having rectangular end members, adapted to be spaced apart and hinged to a running board to permit of movement of said end members from positions substantially parallel to positions substantially perpendicular to the running board, and a hood adapted to be supported on said end members when in perpendicular position, said hood comprising leaves hinged together and adapted to form three sides of the receptacle of which the end members and the running board form the other three sides, means beneath the running board for supporting said receptacle when folded and means for releasably securing said hood to said end members when erected on the running board, said means comprising wing bolts carried by said end members and corresponding marginal slots in said leaves.

3. A receptacle for luggage and the like, having end members adapted to be secured to and erected upon a running board and a hood adapted to be extended and folded and to form an enclosure for the space bounded by the end members and the running board when in extended position and to be stored beneath the running board when in folded position.

4. A receptacle for luggage and the like, having end members adapted to be secured to and erected upon a running board, and a hood adapted to be extended and folded and to form an enclosure for the space bounded by the end members and the running board when in extended position, and adapted to be stored beneath the running board when in folded position, and means for supporting said hood in folded position beneath the running board, said means comprising slotted rails secured beneath the running board and ears carried by the hood and sliding in the slots of the rails.

5. A receptacle for luggage and the like, having end members adapted to be secured to and erected upon a running board and a hood adapted to be extended and folded and to form an enclosure for the space bounded by the end members and the running board when in extended position, and adapted to be stored beneath the running board when in folded position, and means for supporting said hood in folded position beneath the running board, said means comprising rails secured beneath the running board, each of said rails being provided with two slots, the lower slot closed at both ends and the upper slot open at one end, and ears secured to the edges of said hood and adapted to be positioned slidably in the slots of said rails, to support the hood from the running board.

6. A receptacle for luggage and the like, comprising end members adapted to be secured to and erected upon a running board, and a hood, adapted to be extended and folded and to form an enclosure for the space bounded by the end members and the running board when in extended position and adapted to be slidably supported on rails beneath the running board when in folded position, and means for permitting said hood to be withdrawn beyond said rails while remaining secured thereto.

7. A receptacle for luggage and the like, having rectangular end members, adapted to be spaced apart and hinged to a running board to permit of movement of said end members from positions substantially parallel to positions substantially perpendicular to the running board and a hood adapted to be supported on said end members when in perpendicular position, said hood comprising leaves hinged together and adapted to form three sides of the receptacle of which the end members and the running board form the other three sides, and said hinged hood members being foldable beneath the running board.

8. In combination with a supporting board, a collapsible casing adapted to be folded beneath the supporting board and to be erected upon the upper side thereof, and closing end members for the casing when erected pivotally mounted permanently on the upper side of said board and adapted to serve as step treads when the casing is folded, and guiding and supporting means beneath said board for supporting the casing when folded and for anchoring one side thereof when erected.

SAMUEL KRIMSTEIN.